United States Patent [19]

Papadopoulos et al.

[11] Patent Number: 5,123,095
[45] Date of Patent: Jun. 16, 1992

[54] INTEGRATED SCALAR AND VECTOR PROCESSORS WITH VECTOR ADDRESSING BY THE SCALAR PROCESSOR

[75] Inventors: Gregory M. Papadopoulos, Arlington; David E. Culler, Boston; James T. Pinkerton, Newton, all of Mass.

[73] Assignee: Ergo Computing, Inc., Peabody, Mass.

[21] Appl. No.: 297,981

[22] Filed: Jan. 17, 1989

[51] Int. Cl.⁵ .......................................... G06F 15/347
[52] U.S. Cl. ............................. 395/375; 364/DIG. 1; 364/228.1; 364/231.8; 364/232.21; 364/265.4; 364/262.4; 364/736
[58] Field of Search ... 364/200 MS File, 900 MS File, 364/736

[56] References Cited

U.S. PATENT DOCUMENTS

| | | | |
|---|---|---|---|
| 4,574,351 | 3/1986 | Dang et al. | 364/200 |
| 4,713,749 | 12/1987 | Magar et al. | 364/200 |
| 4,719,602 | 1/1988 | Hag et al. | 365/189.05 |
| 4,780,811 | 10/1988 | Aoyama et al. | 364/200 |
| 4,794,517 | 12/1988 | Jones et al. | 364/200 |
| 4,794,524 | 12/1988 | Carberry et al. | 364/200 |
| 4,849,882 | 7/1989 | Aoyama et al. | 364/200 |
| 4,901,233 | 2/1990 | Liptay | 364/200 |
| 4,945,479 | 7/1990 | Rusterholz et al. | 364/200 |
| 4,964,035 | 10/1990 | Aoyama et al. | 364/200 |
| 4,972,338 | 11/1990 | Crawford et al. | 364/200 |

Primary Examiner—Thomas C. Lee
Assistant Examiner—Mehmet Geckil
Attorney, Agent, or Firm—Hamilton, Brook, Smith and Reynolds

[57] ABSTRACT

A vector processor is closely integrated with a scalar processor. The scalar processor provides virtual-to-physical memory translation for both scalar and vector operations. In vector operations, a block move operation preformed by the scalar processor is intercepted, the write command in the operation is converted to a read, and data resulting from a vector operation is returned to the address specified by the block move write command. Writing of the data may be masked by a prior vector operation. Prefetch queues and write queues are provided between main memory and the vector processor. A microinstruction interface is supported for the vector processor.

17 Claims, 6 Drawing Sheets

INTEGRATED SCALAR AND VECTOR PROCESSORS WITH VECTOR ADDRESSING BY THE SCALAR PROCESSOR

BACKGROUND OF THE INVENTION

Many scientific computer algorithms and applications are dominated by regular, repetitive floating point calculations on sequences (or vectors) of numbers. For example, let X and Y be sequences of numbers with n elements (vectors of length n):

$$X = x1, x2, \ldots, xn$$

$$Y = y1, y2, \ldots, yn$$

The vector addition of these sequences is the pointwise operation that independently adds the corresponding components of X and Y. That is, the vector sum of X and Y is:

$$X + Y = x1 + y1, x2 + y2, \ldots, xn + yn$$

Similarly, the vector product is pointwise product of X and Y:

$$X*Y = x1*y1, x2*y2, \ldots, xn*yn$$

It is important to note that the pointwise operations are completely independent of each other, meaning that $xj*yj$ does not require the result of (does not depend upon) $xi*yi$, for all i and j. Contrast this to a recurrence like the vector inner product, where the partial sum $sj = yj*yj + s(j-1)$ directly depends upon the previous partial sum $s(j-1)$. Inner product is also known as a reduction operator, because the result of a vector computation is reduced to a single number, in this case the last partial sum, sn. In practice, a recurrence is much more difficult to compute quickly because the computation cannot be pipelined.

Vector sum, product, and inner product are two-input or dyadic vector operations. Single-input or monadic vector operations perform calculations on the components of a single vector and, typically, a single number, or scalar. For example, the vector scale operation multiplies each component of a vector by the same scalar, $$a*X = a*x1, a*x2, \ldots, a*xn$$

There are also monadic reduction operators, for example, adding all of the elements in a vector, finding the element of the greatest absolute value, or counting the number of non-zero elements. These very simple vector operations can be combined into slightly more complex ones. For example, SAXPY, the inner loop of the Linpack benchmark is a composition of vector scale and vector sum;

$$\text{SAXPY A Z Y} = Y + (a*X) = y1 + a*x1, y2 + a*x2, \ldots$$

Generally speaking, vector operations are divided into two broad classes as suggested by the above examples:

Linear Combinations: e.g., Vector sum, product, scale, difference, SAXPY.

Recurrences/Reductions: e.g., Vector inner product, total, find maximum, count zeros.

An important property of many complex algorithms and applications is that they can be readily decomposed into sequences of simple vector operations. Put another way, simple independent vector operations, like SAXPY, can be used in a sequence of calculations to efficiently compute more complex functions, like the inverse of a matrix.

In practice, many complex scientific algorithms are vectorizable; they can be reformulated into sequences of simple vector operations such that 60–95% of all floating-point operations are performed as vector arithmetic. However, a non-vector, or scalar, processor does not, in general, benefit from vectorization because it still performs about the same amount of work. For example, vector sum $Z = Z + Y$ would be compiled on a scalar processor (in a stylized machine code) as:

|       | j = 1         | ;; initialize j         |
|-------|---------------|-------------------------|
| Loop: | fetch X[j]    | ;; read xj              |
|       | fetch Y[j]    | ;; read yj              |
|       | add           | ;; add them             |
|       | store Z[j]    | ;; write zj             |
|       | j = j + 1     | ;; increment j          |
|       | compare j, n  | ;; test for end of vector |
|       | jump-LEQ Loop | ;; repeat if j = n      |

Although the computation is quite regular and repetitive, the scalar processor sequentially performs the memory reads, the arithmetic, store, and loop control. In contrast, a vector processor is a computer architecture that is especially suited to performing vector operations. A vector processor is associated with a scalar processor such that normal scalar processing can be performed but vector operations can be efficiently dispatched to the vector processor. The vector operation is performed very rapidly by the vector processor, and then the scalar processor can resume computation. While most vector processor architectures allow the scalar processor to continue computing during a vector operation, it is still appropriate to think of the vector processor as extending the instruction set of the scalar unit. That is, the scalar processor not only has an "add" instruction for adding two scalar quantities but also a "vadd" instruction for adding two vectors.

Frequently, a vector processor can perform a vector operation at least an order of magnitude faster than if the vector operation were performed by the scalar processor alone. This great increase in performance occurs because the vector processor architecture exploits the regular, repetitive structure of simple vector operations (especially linear combinations) by employing a highly specialized form of parallel processing. There are two basic techniques pipelining and functional parallelism.

Pipelining is a design technique whereby each component of the vector is computed "assembly-line" fashion, so at any time several operations may be in various states of completion. The number of simultaneous operations is determined by the number of pipeline stages (or the depth). The rate at which results are computed (the throughput) is determined by the rate at which an operation can be advanced from one stage to the next, whereas the total time to complete an operation on a particular datum, called the latency, is directly proportional to the pipeline depth. Pipelining relies on the lack of dependence among elements of the result vector, so it works very well for linear combinations, but actually makes recurrences run more slowly (recurrences are limited by the latency—which is always several times worse than the throughput).

Functional Parallelism is a design technique whereby the different aspects of processing a vector are performed by function units that operate in parallel. The principal function units in a vector processor are:

Address Generation, the computation of memory addresses for vector data, including virtual address translation.

Memory READ/WRITE, the actual control of the system memory.

Numeric Pipeline, the unit that performs the arithmetic operation.

Loop Control the control of the number of vector operations to perform.

There are two types of vector processors based on whether vector operations take place directly on vectors stored in memory (a memory-to-memory architecture) or whether the vectors are first loaded into vector registers, the operation is performed on the registers and then the result is written back to memory (a register-to-register architecture). Indeed, there are two design camps: the CDC STAR 100, CYBER 205, and ETA 10 are memory-to-memory architectures, whereas all of the CRAY machines and most other vector processors suscribe to the register-to-register philosophy.

It is not immediately obvious why the register-to-register machines should prevail. Indeed, it is widely acknowledged that memory-to-memory architectures are more "expressive" and easier to compile to. Register to register machines require explicitly loading and unloading of vector registers and, because vector registers are a small, fixed length (typically 64 elements per vector register), long vectors must be broken up into pieces, or stripmined, by the scalar processor.

A well-designed register-to-register architecture overcomes these shortcomings with two techniques. Chaining permits the loading and storing of vectors to and from registers to occur in parallel with operations on vector registers. By allowing the scalar processor to continue execution during a vector operation, the stripmining computation can be "hidden" during the vector operation.

Conversely, memory-to-memory machines have suffered from two hard design problems. First, there is an increased requirement for main memory bandwidth. In a register-to-register machine, intermediate or temporary vectors, during a sequence of vector operations, can often be stored in a vector register; whereas the memory-to-memory machine places the temporary vector back into main memory only to fetch it again, possibly on the very next vector operation. Second, some designs suffer from excessive latency in the memory system. That is, it takes a relatively long time to get the first element of a vector from memory. The same is true of a register-to-register machine, except that when a vector is in a register the latency is much lower and chaining can sometimes be used to help mask memory latency.

Of course, real applications seldom comprise only vector operations. There are always aspects of the computation which do not match the capabilities of the vector processor. For example, the computation may not be regular, may have a significant amount of I/O, may operate on data types that the vector processor cannot handle (like characters) or may be a true sequential process (like first order recurrences). Those portions of the computation which cannot be vectorized are called scalar or nonvectorizable.

The nonvectorizable portion of a computation sets a fundamental limit on how much a vector processor will speed up an application. The governing relation is called Amdahl's Law, after Gene Amdahl, the architect of the IBM 360. Amdahl's Law is best understood with a simple example. Suppose that a program is 90% vectorizable, that is, 90% of the computation matches the capabilities of a vector processor whereas 10% is nonvectorizable and must be executed by the scalar processor. Now even if the vector unit were infinitely fast, the computation could only be sped up by a factor of ten. The vector unit does not affect the speed at which the processor works on the scalar sections of the program, so the execution time is dominated by the scalar code. If the vector unit is only ten times faster than the scalar processor (a common case), then the program runs only five times faster, half of the time being devoted to vector processing and the other half to scalar. Amdahl's law is given by the following formula:

$$\text{speed up} = \frac{1}{1 + (1/\text{vspeed} - 1)V}$$

where, vspeed = the relative rate of vector vs. scalar processing

V = the fraction of vector operations (%vectorizable/100)

Thus, the expected performance increase is a nonlinear function of the vectorizability. For instance, with V = 0.5 (50% vectorizable) the very fastest vector processor could offer a total speed-up of only 2×. For a program that is 99% vectorizable, an infinitely fast vector unit would offer a hundred-fold performance improvement while a more modest ten-times vector unit would offer almost a ten-fold increase in speed.

Often, the speed-up of an otherwise heavily vectorizable program is not even as good as Amdahl predicts, because the vector unit does not consistently speed up all vector operations. The usual culprit is the average vector length on which the vector unit is asked to operate. All vector processors incur a fairly fixed overhead for starting any vector operation called the start-up time. If a vector is short, then the start-up time dominates the computation. Hockney has quantified this overhead in terms of the half-power point of a vector unit: the length of vector required such that the start-up time and time required spent actually computing the elements are equal. In other words, the Hockney number is the length of vector required for the vector processor to achieve half of its peak performance.

The start-up time can come from several sources. The pass-off time to the vector unit is the amount of time required for the scalar processor to set up a vector operation. If the vectors are being retrieved from memory, then the memory latency, the time between a memory request and a response, can be a significant factor. The fill time is the time required for the first element of a vector to make its way all the way through the numeric pipeline, and is directly proportional to the pipeline depth. The shutdown time must also be considered; it is comprised mainly of resynchronization with the scalar processor.

A high Hockney number (i.e., only long vectors perform well) may affect the overall program speedup as strongly as the percentage vectorization. In practice, a Hockney of about 10 elements is considered very good, 20 is usual, and above 30 or so becomes marginal for a number of applications. Traditionally. memory-to-memory machines have had far worse Hockney numbers than register-to-register designs; often experiencing a half power point at 50 or even a 100 elements.

A number of other factors influence the effectiveness of a vector processor, but most important seems to be the organization and management of the main memory system. Main memory bandwidth and latency are the two important metrics. Insufficient bandwidth will starve the vector pipeline and yield low, sustained (long vector) performance. High latency can have a very negative effect on the Hockney number and thus cause short vectors to suffer.

Obtaining high bandwidth with tolerable latency is the real design challenge of a vector processor, especially when large amounts of memory are required. When little main memory is needed, say for signal processing, then very fast but expensive static RAM can solve both problems. Main memories are often interleaved into separate banks so that several memory requests can be processed simultaneously to increase the effective memory bandwidth. But generally speaking, latency tends to be proportional (relative to bandwidth) to the number of interleaves, and the memory system becomes susceptible to bank conflicts. Bank conflicts arise when one memory interleave (or bank) is accessed before it has finished its previous request. Normally, memory is interleaved so that contiguous locations fall into different banks. Thus, when a vector is accessed sequentially (stride one), each element is retrieved from a different bank, modulo the number of banks. Non-contiguous access can occur in several circumstances. A constant stride operation may pick up every Nth element. If the number of banks is not prime relative to N, then bank conflicts are guaranteed to arise. Additionally, a scatter/gather operation uses an indirection vector or a bit mask to determine the elements that are to be accessed, causing nearly random requests to be made of the memory system.

For scalar processors, caches have been employed to aid both memory bandwidth and latency. Caches rely on locality of data reference, a property that does not seem to hold for a number of important applications. A cache may help when a lot of operations are performed on a small set of short vectors, but have a strong negative effect when the size of the vectors is larger than the cache. In practice, caches are a poor solution to the vector memory bandwidth/latency problem. There is no substitute for honest memory bandwidth and a "tight" low-latency memory protocol.

Although they perform relatively simple and regular operations, vector processors are often very complex. As indicated above, a vector processor comprises several function units: address generation, main memory, numeric pipeline, and loop control. For a register-to-register architecture, the multiported vector register file must also be considered, as well as the added complexity to chain load/store operations with register-to-register operations. In addition, if the scalar processor has a virtual memory system, then the virtual-to-physical translation must be accomplished at vector speed and the possibility of a page fault mid-vector must also be accounted for. Finally, if the scalar processor has a cache, then the scalar cache must be kept consistent, or coherent, with the operation of the vector unit.

An alternative to the vector extension closely integrated with a scalar processor is a separate but attached array processor which performs the vector processes. An array processor is traditionally a distinct, microcoded processor with its own private memory subsystem. To use an array processor, a scalar processor must copy the data on which the array processor is to operate into the array processor memory configure the array processor to perform the required computation, and then synchronize on the completion of the array processor operation.

The overhead factors in dispatching the vector process to the array processor and subsequent synchronization can contribute to extraordinarily high Hockney numbers. As such, the array processor philosophy is tuned for solving large problems directly at the expense of efficiently performing simple, short vector operations. A sophisticated compiler would be required to identify the complex processes for which the array processor may be used efficiently. As a result, the array processor is usually only selected by explicit programming. To make a problem fit on an array processor, the application writer relies on the foresight of the microcoder to provide just the right function. This often is not the case, and the application writer is often precluded, due to concerns with the cost of overhead relative to the benefits of use of the array processor, from decomposing the problem into simple vector operations to be executed by the array processor. The other choice is for the programmer to write new microcode to solve his special problem, an arduous task at best.

Design complexities have, to date, prevented the deep integration of vector processing with inexpensive processors like those found in personal computers. Thus, specialized vector processing in the personal computer environment has been limited to the attached array processor architecture.

SUMMARY OF THE INVENTION

The present invention overcomes a number of the obstacles to a vector processor extension by employing a scalar processor such as the Intel 80386 in a novel way to help perform vector operations. The 80386 like many CISC (Complex Instruction Set Computers, as contrasted with RISC or Reduced Instruction Set Computers) has a very heavily optimized block move instruction. The block move operation is intended to provide a very rapid way for a program to copy data from one part of memory to another. On the 80386, a block move (called a string move) instruction works off of internal registers which specify (1) the starting address of the source data, (2) the starting address of the destination area, and (3) the number of bytes or words to copy. Moreover, the operation performs virtual memory translation for every word copied and is restartable after an external interrupt or a page fault.

In accordance with principles of the present invention the scalar microprocessor such as the 80386 is employed as the address generator and loop control for a memory-to-memory vector processing extension. This may be accomplished by intercepting the block move write addresses to perform in-place vector operations.

Consider the string move instruction that is intended to copy N words starting at memory location X to the destination area starting at location Y. We can think of the scalar processor as performing a vector identity operation $Y = X$, $$Y = x1, x2, \ldots, xN$$

where the previous values of $Y = y1, y2, \ldots, yN$ are overwritten. The scalar processor accomplishes this operation by quickly performing the following loop N times:

```
            count = N
Loop:       fetch X[j]
            store Y[j]
            j = j + 1
            count = count - 1
            compare count, 0
            jump-GT Loop
```

Note that this sequence is encoded as a single 80386 instruction (called REP MOVSDW) and performed in highly optimized microcode that is limited only by the processor-memory bus cycle time (4 clocks per iteration, 2 for the read cycle and 2 for the write cycle).

With the present invention, instead of overwriting the elements of Y, we instead intercept the writes, read the location, perform an operation on the value we read and the value we were to have written and then write the result into Y. This lets us perform an in-place (also called a two address) operation on Y.

Suppose, we wanted to perform the vector sum, $Y = Y + X$, $$Y = y1 + x1, y2 + x2, \ldots, yN + xN$$

The scalar processor rapidly supplies a sequence of physical addresses to the vector unit. The operation is even simpler when it is realized that only writes need to be intercepted. The reads of the elements of X by the scalar processor can proceed without special action, while the write on the element contains all of the necessary information to perform the operation, the value of xj and the address of yj. So there is a decoupling for the vector unit as well: the vector unit need only consider the operation to perform on independent (xj, address yj) pairs, insensitive to how the pair was generated, by a move string instruction or otherwise.

Note that the vector operation is very tightly coupled to the scalar instruction stream and qualifies as a true vector extension to the otherwise non-vector microprocessor. The vector addresses and vector length are contained in registers inside the scalar unit. There is no need to copy them to the vector unit. The virtual address translation and page fault mechanisms are those supplied by the scalar processor, and resynchronization to scalar stream is automatic. The only real external setup charge is instructing the vector unit of the desired operation (e.g., add, multiply).

In accordance with the present invention, a data processing system comprises a memory and a microprocessor which performs scalar operations, the processor comprising means for generating physical memory addresses from virtual memory addresses. The system further comprises a vector processor associated with the microprocessor. The vector processor is responsive to vector instructions to receive from memory data addressed by the physical addresses from the scalar microprocessor. The vector processor performs a vector operation on the received data and stores the results of the vector operation in the memory at physical addresses designated by the scalar processor.

More specifically, the microprocessor is able to perform a block move instruction by reading data from a first set of addresses in memory and writing the data from the first set of addresses into locations at a second set of addresses in memory. The vector processor, in receiving data from the memory during the block move operation of the microprocessor, inhibits writing of the data into the second set of addresses. The vector processor performs a vector operation on the data and writes the results of the vector operation at the second set of addresses.

To allow for certain conditional operations in this two-address model, one operation which the vector processor is able to perform is that of generating a mask vector based on a condition of the received data. In a subsequent vector operation, the processor may inhibit storage of the results of the subsequent operation as a function of the mask vector.

To improve memory bandwidth with low latency, the memory may be a static column random access memory with short fetch and write queues. Data in a fetch queue is invalidated in the event of a write operation by the microprocessor to the address in memory from which the data was read. Further, read and write operations are blocked relative to the location in memory into which the results of a vector operation are to be written.

A cache memory is associated with the microprocessor for scalar operations but is not used in vector operations. Physical addresses from the microprocessor may identify distinct vector and scalar address spaces which address a common physical memory space to allow for bypassing of the scalar data and/or code cache. The system invalidates data in the cache when the data is to be replaced by the results of an operation being performed by the vector processor.

A register storage unit is associated with the vector processor to store the results of vector operations and to provide additional inputs to the vector operations. The microprocessor is able to read and write data from and to the storage unit. A control store is dedicated to the vector processor for storing vector processor microinstruction sequences which are addressed by single instructions from the microprocessor. The vector processor repeatedly processes the sequence relative to successive multiple word records in a data driven operation.

A benefit of the system form is that everything is physically "close"—there are no large intervening pipelines between the processor and the vector unit and the processor and memory. As such, we have been able to achieve exceptionally good short-vector performance (Hockney of around 3 or 4) for even a register to register machine, let alone a memory-to-memory one. We also tend to underutilize the numeric pipeline. Memory bandwidth is almost always the bottleneck even though we keep up with the block move instruction. This contributes to the good, short vector performance but also allows the pipeline to be very shallow and can thus be used to directly compute first order recurrences.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views.

DESCRIPTION OF A PREFERRED EMBODIMENT

Figure 1A:
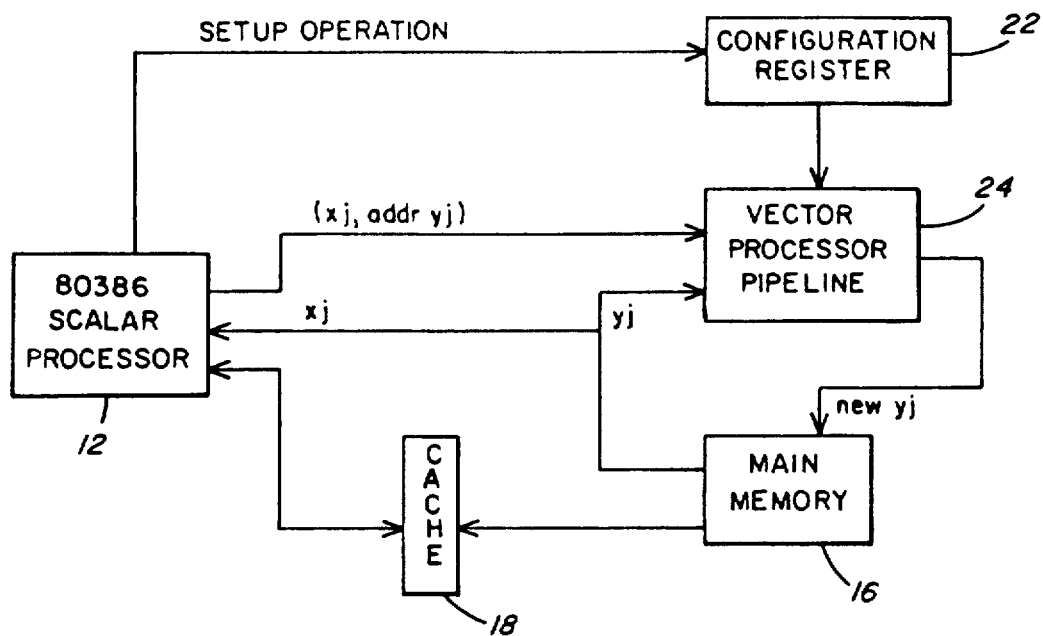
FIG. 1A is a functional block diagram of the system embodying the present invention.
Figure 1B:
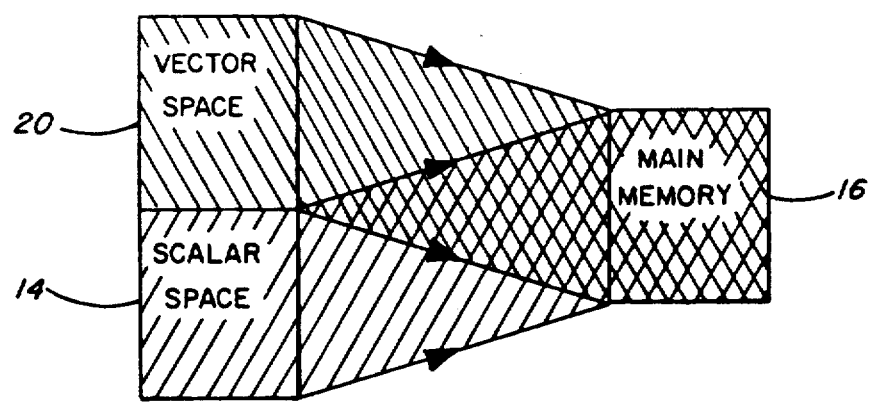
FIG. 1B is an illustration of mapping of vector and scalar address spaces into memory.

The programming model for the present invention is illustrated in FIG. 1A. In scalar operations, the 80386 microprocessor operates on data in scalar addresses to read and write information from a main memory 16 through a cache 18. As illustrated in FIG. 1B, scalar and vector addresses processed by the 80336 define separate scalar and vector address spaces 14, 20 which are aliased into the same physical locations in memory 16. Thus, operations in vector space affect the data accessed through scalar space, and vice versa. Cache 18 is only used for scalar space.

A vector operation is effected by first writing a vector command to a configuration register 22 from the 80386 processor 12. The vector processor 24 is set up to process data in a vector operation when the data is available at its two inputs. Next, the 80386 is instructed to perform a block move operation in vector space. A read of xj from main memory to the vector space bypasses the cache. In the next step of the block move operation, the 80386 provides a write command into vector space with the operand xj just read from main memory. In accordance with the present invention, that write operation is intercepted, the operand xj is applied as one input to the vector processor 24, and the address from the 80386 write operation is used to read a second operand yj which is applied to the vector processor. With successive retrievals of the x and y operands in this fashion, the vector processor performs in its pipeline the operation indicated by the configuration register 22. Each output of the vector processor is then written into main memory at the location for yj indicated by the original 80386 block move write instruction.

As already discussed, the use of the 80386 processor to generate addresses even for vector operations assures that one device, the microprocessor, controls all virtual-memory-to-physical-memory translations to facilitate coherence between the scalar and vector operations. The vector processor design need not be concerned with any repaging performed by the microprocessor. Also, the address generation and loop functions of the vector process are performed in parallel with the vector pipeline at no additional cost in hardware.

Figure 2A:
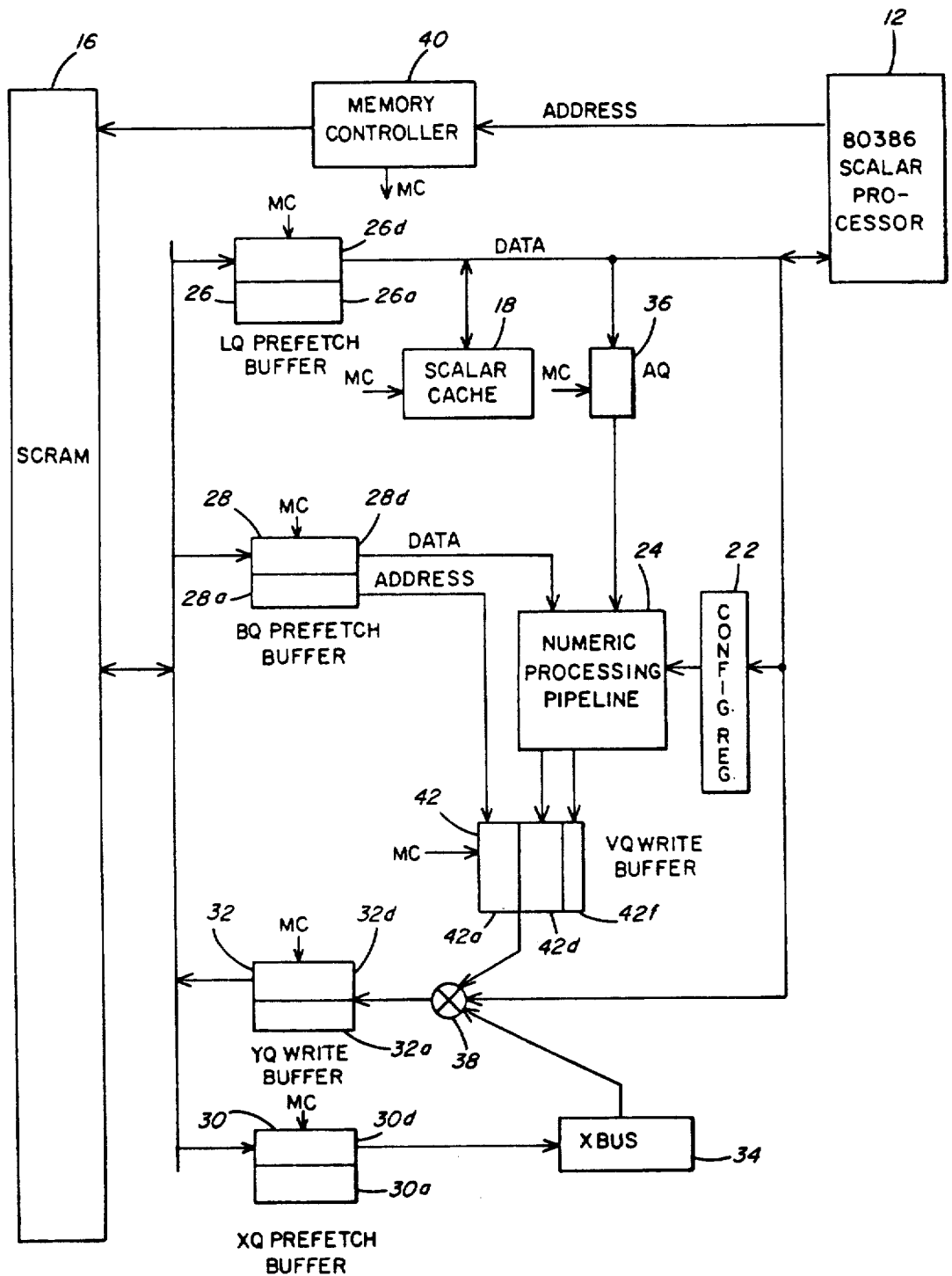
FIG. 2A is a block diagram of the hardware implementing the system of FIG. 1.

FIG. 2A further illustrates a specific implementation of the programming model of FIG. 1. In order to increase the bandwidth of the main memory a static column random access memory (SCRAM) is used as the main memory 16. To further increase bandwidth, the SCRAM utilizes a 64-bit data path rather than the 32-bit path required by the 80386. Also, several prefetch buffers 26, 28 and 30 and write buffers 32 and 42 are utilized in the system. The buffer 30 is used to fetch data for a separate scalar processor on a separate X bus 34 which is not related to this invention. The SCRAM and queue combination avoids the expense of a static RAM while also avoiding interleaved banks.

The LQueue prefetch buffer 26 receives data for both scalar and vector operations. During scalar operations, the data from the buffer is cached in a cache 18. In a vector operation the buffer 26 receives the xj values read during the read steps of a block move operation. The data is read into the 80386 and then output with a write command. The operand xj is then written into AQueue 36 which serves as an input to the vector processor 24. Also, the address from the write command is used to read a yj value from the memory 16 into the prefetch buffer 28. The buffer 28 serves as a queue for the y values applied to the second input of the vector processor 24.

Data resulting from the vector operation is applied through a VQueue write buffer 42 into a YQueue write buffer 32 and then back to memory 16. The buffer 32 is also used to write scalar data directly from the 80386 microprocessor and data from the X bus 34 through a multiplexer 38.

Read and write operations relative to the memory 16 and the transfer of data through the several queues and the pipeline of the vector processor are controlled by a memory controller 40 which is closely linked to those elements of the system. The memory controller 40 receives the physical addresses from the 80386, monitors and controls the data within the several queue buffers, performs the read and write operations to main memory 16, and performs a number of logical operations to assure the coherence of the system as will be discussed below.

When the memory controller receives the first read command in a vector operation, it continues to fetch the data from sequential addresses as required for a vector operation. Similarly, when it receives a vector write command, it prefetches data from sequential addresses following the address in the command. In the event that a subsequent read address is not the same as the prefetched address, the queue is at least partially purged and the proper data is retrieved with a fetch from the subsequent address.

Vector operations are performed by a numeric processing pipeline. The pipeline 50 repeats a code sequence for each of successive multiword records received from the AQueue 36 and BQueue 28. For a given vector operation, a record length of from one to 8 words is chosen. The processor operates as a dataflow machine; once initialized, the pipeline 50 fires as soon as the full record is available in the AQueue and BQueue and continues through a sequence. As the words from the AQueue and BQueue are read into the pipeline 50, the 80386 may continue to address the words of subsequent records in its continued block move operation. These words are read into the LQueue, AQueue and BQueue as discussed, and the pipeline 50 fires again when it completes a sequence and finds the next full record in the queues.

Each of the prefetch buffers 26, 28 and 30 and the write buffers 42 and 32 are comprised of a first-in-first-out (FIFO) data storage 26d, 28d, 30d, 32d, and 42d. Each is associated with an address FIFO 26a, 28a, 30a, 32a, 42a which is physically and logically a part of the memory controller 40. By means of the address FIFOs, the memory controller is able to monitor the data which is in those queues and enforce the rules of coherence. Further, the addresses associated with the data in the vector processor pipeline 24 are retained in a VQueue FIFO 42. The VQueue receives the addresses included in the write commands from the 80386 and data output from the pipeline 50 and forwards those addresses with the data to the YQueue 32a and 32d.

Figure 2B:
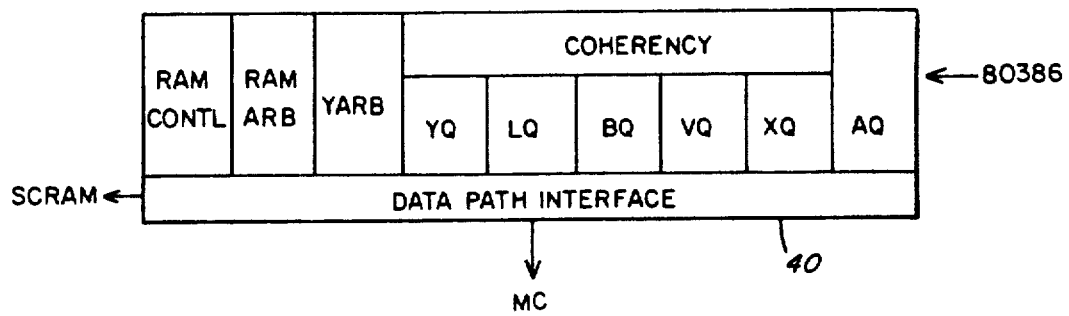
FIG. 2B illustrates the organization of the memory controller.

As illustrated in FIG. 2B, the memory controller includes queue logic elements designated as LQ, AQ, BQ, YQ, VQ and XQ which control pushing data into the respective queues, outputting data from the queues and popping data from the queues. These queue logic elements operate independently, in response to requests, to look through the coherency logic to the addresses in other queues and to respond to the coherency rules to generate pointers to each of the first-in-first-out devices of the buffers 26, 28, 30, 32 and 42 and to make memory requests. An arbitrator YARB controls multiplexer 38. RAM control logic controls the read and write operations requested by the queue logic elements, and RAM arbitrator logic RAMARB selects the queue which has access to the memory. All elements communicate with physically separate data path chips through a data path interface.

To maintain coherence in the system, the coherency logic of the memory controller assures that several rules are followed. With a read command, all conflicting writes are blocked until the read is completed. Once a write command is posted to memory, either as part of a block move command in a vector operation to the VQueue 42 or as a scalar write to the YQueue 32, any conflicting reads or writes relative to the same address are immediately blocked. Any scalar writes to the YQueue are blocked until the vector queue 42 is empty. All conflicting reads are blocked until the write is completed. When the write is posted, if that address is located in any of the prefetch buffers, other than in the BQueue buffer with data for which a write command has been received, the associated data is invalidated. Also, any data in the cache 18 for the same address must be immediately invalidated.

Figure 3A:
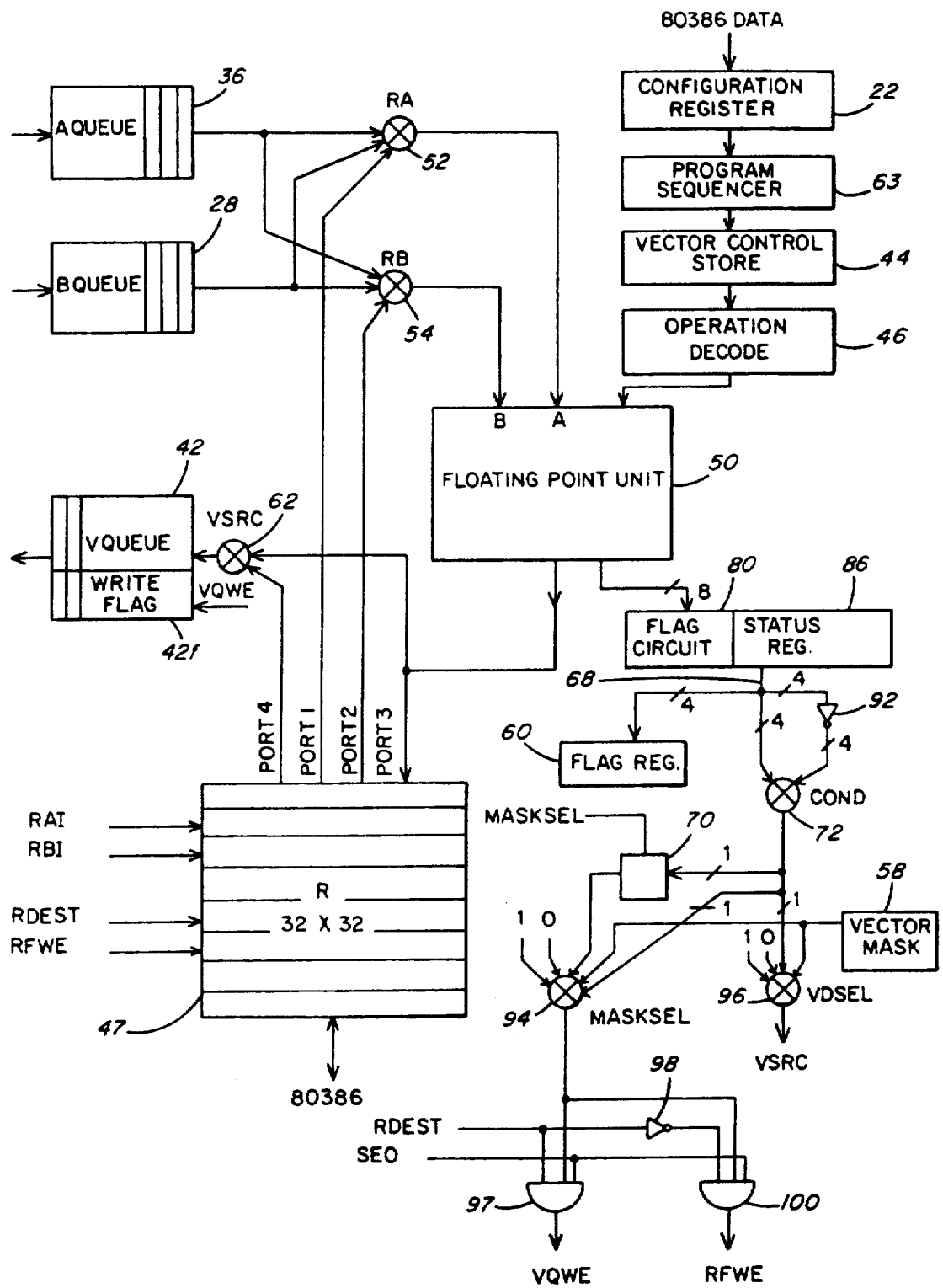
FIG. 3A is a more detailed diagram of the vector processor of FIG. 2.
Figure 3B:
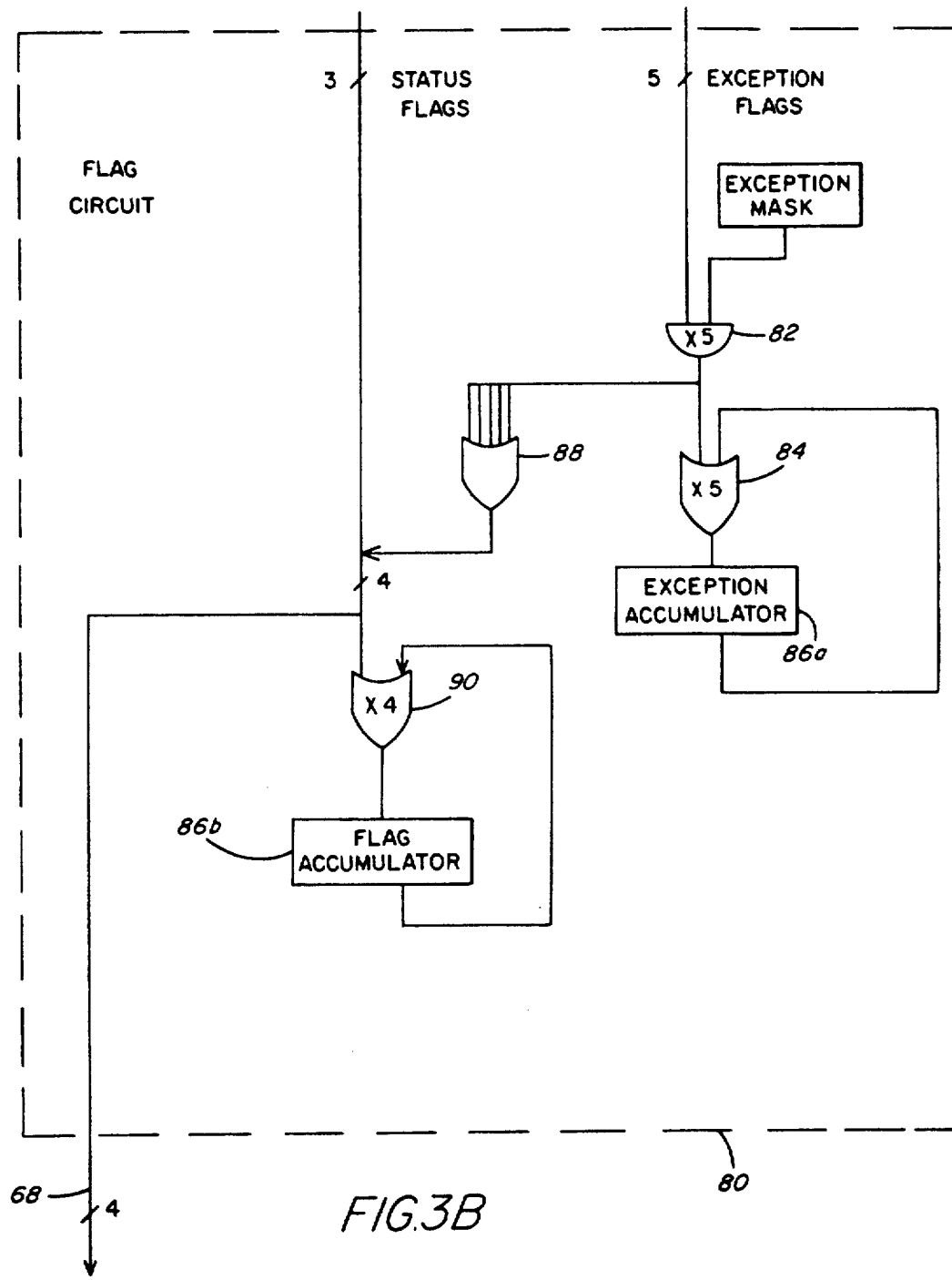
FIG. 3B is a more detailed diagram of the flag circuit of FIG. 3A.
Figure 4:
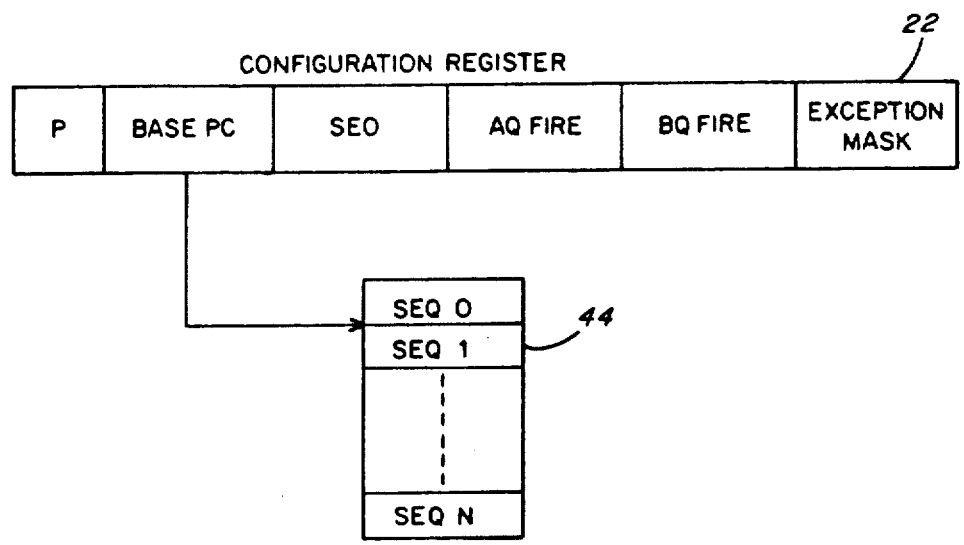
FIG. 4 is an illustration of the vector processor command register with a pointer to a sequence of microinstructions associated with the vector processor.

Further details of the vector processor are illustrated in FIGS. 3–5. The vector processor is programmed as a single transformation on a set of records, collections of 1 to 8 words, $$Y_i, R \leftarrow f(A_i, B_i, R)$$

where,
Ai is a record from the AQueue.
Bi is a record from the BQueue.
R is a scalar register set 47.
Yi is a record for the VQueue
f is the transformation specified by the microsequence.

Bi is optional and the production of Yi may be inhibited, in which case the sequence is executed only for its side effects on R and flags.

The fields of the configuration register 22 are illustrated in FIG. 4. A P field indicates whether the operation is single or double precision. In double precision sequences, each microinstruction is executed twice, with the processor automatically incrementing the least significant bits of addresses. The P field also allows selection of unsigned integer or signed integer processing. The AQ fire and BQ fire fields identify the size of a record by specifying the numbers of elements required in each of the AQueue and BQueue to fire the sequence. The numbers are doubled for a double precision operation. When the SEO flag is set, all operations are done for side effects only; that is, no result is written through the VQueue 42 or to register file 47.

The configuration register also includes a field BASE PC which serves as an initial value for a program sequencer 63. It thus points to a first microinstruction word in a control store 44 for the vector processor. As illustrated in FIG. 4, the operation may select any of a number of microinstruction sequences, a selected sequence to be repeated for each record fetched into the AQueue and BQueue by the 80386 block move operation. The sequence determines the particular transformation f to be performed.

Figures 5A, 5B:
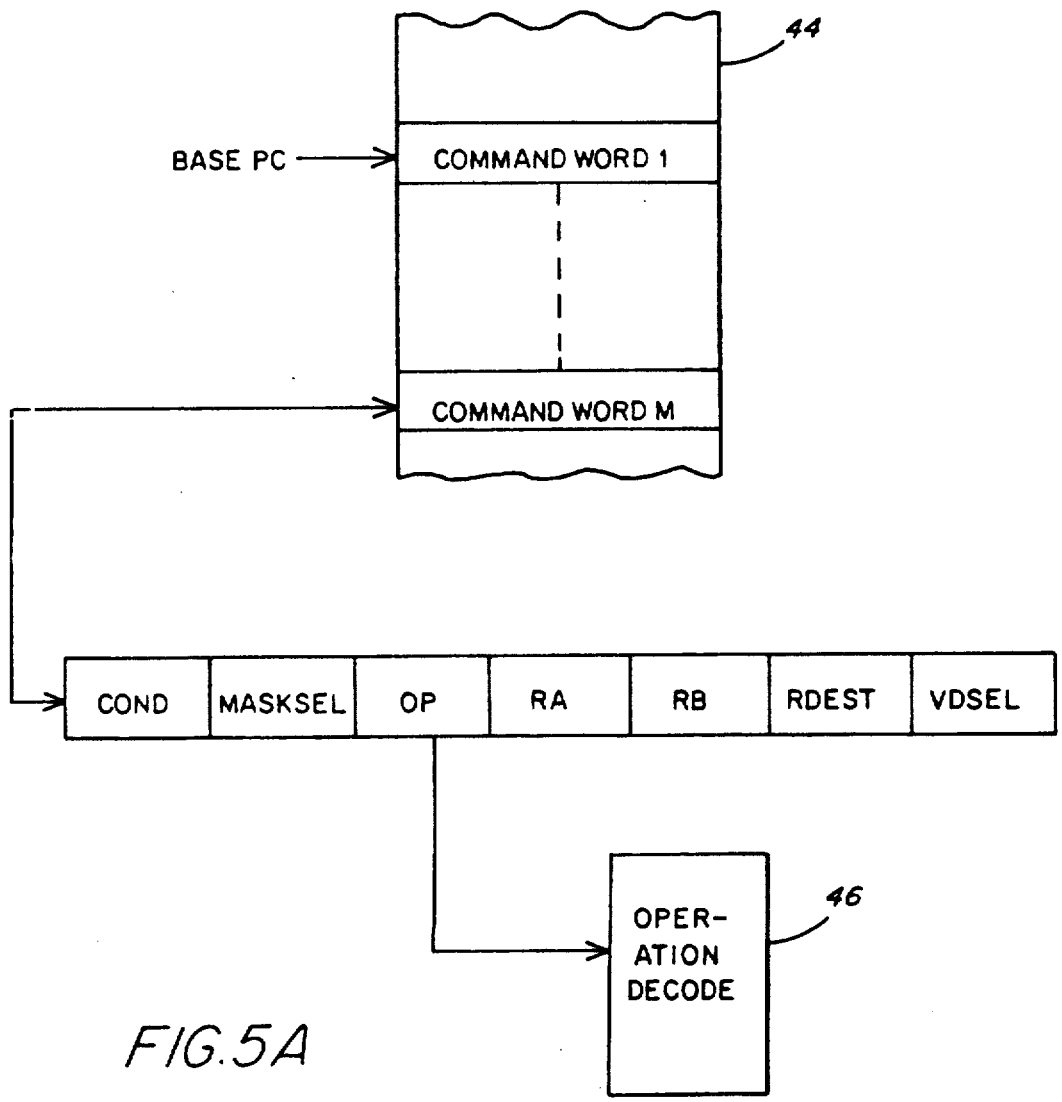
FIG. 5A illustrates the structure of the command words in the vector processor microinstruction sequences.
FIG. 5B illustrates the RA and RB fields of the command word.

The microinstruction format for the command words of the control store 44 is illustrated in FIG. 5A. The OP field of the microinstruction specifies one of 32 possible operation codes and is decoded by an operation decode 46. The decoded OP field serves as the microinstruction to a floating point unit 50 which is based on a Texas Instrument 8847 floating point unit. The instruction is applied to an instruction pipeline internal to the 8847 which runs parallel to the data. Thus, each decoded instruction carries the code required for each stage of the 8847 pipelined processor. The microinstruction flows through its pipeline in parallel with the data and the appropriate code is applied to each stage as the data is received by that stage.

Each microinstruction as illustrated in FIG. 5A, within a sequence from the control store 44, controls both the inputs to the floating point unit and writing of the results of the vector operation into either the VQueue 42 or registers 47.

The RA and RB fields select the A and B inputs to the floating point unit 50 through multiplexers 52 and 54. Each is as illustrated in FIG. 5B. The 1-bit SELRF field selects whether the input to the multiplexer is taken from the registers 47 or from one of the AQueue and BQueue. If the register file is selected, the remainder of the RA or RB field is a 5-bit index RAI or RBI into the register file. Where SELRF is zero, a SELQ field selects the specific queue from which the input is taken. SELQ equal to zero selects the normal queue, that is, the AQueue for RA and the BQueue for RB. SELQ equal to one selects the other queue. The 1-bit POP field determines whether the first element of the queue is to be popped from the queue. The index field determines whether the input from the queue is taken from the top of the queue or one of the other 7 words in the queue.

The RDEST field of the microinstruction determines whether the output from the floating point unit is applied to the VQueue 42 or written into the R registers 47. If the result is to be written into the R registers, the remainder of the field serves as an index to the register file. That index is ignored in a write to the VQueue.

The output from the floating point unit may be applied through the VQueue 42 to the YQueue 32 to be written into memory, or it may be written into one of the thirty-two registers 47, or the output may be generated only for side effects and not written into either the memory 16 or the registers 47. Further, the data written into memory 16 may be taken from a fixed register in the register file 47 rather than from the output of the floating point unit 50. Control of the output is by means of the COND, MASKSEL, RDEST and VDSEL fields of the microinstruction through the circuitry illustrated in the lower right portion of FIG. 3A.

Eight exception and status flags from the floating point unit are first processed in a flag circuit 80 illustrated in detail in FIG. 3B. The five exception flags under IEEE standards indicate the following exceptions: divided by zero, underflow, overflow, invalid, and inexact. These five flags are ANDed in gates 82 with 5-bits derived from the EXCEPTION MASK field in the configuration register. Thus, the EXCEPTION MASK field determines which of the five exception flags from the floating point unit are considered as exceptions for the data output from the floating point unit. To determine whether any exception has occurred for an entire vector sequence, the exceptions are accumulated by OR gates 84 and exception accumulator register 86a. Each of the exception flags passed through the AND gate 82 is ORed by applying the flag as one input to an OR gate 84 and applying the output of the accumulator 86 as the second input. The 5 bits held in the exception accumulator 86a form a portion of the status accumulator 86 which is available to the 80386. The 5 bits passed through the AND gates 82 are ORed in a gate 88 to generate a single exception flag. That flag is joined with three status flags from the floating point unit to provide four flags 68 from the flag circuit 80. The three status flags indicate whether an output from the floating point unit is equal to zero, whether input A is equal to input B, or whether A is greater than B. The four flags are accumulated by OR gates 90 and flag accumulator 86b. The flag accumulator 86b forms a portion of the status accumulator register 86.

As illustrated in FIG. 3A, the four flags from the flag circuit are applied to a 32×4-bit flag register 60. The flag register receives thirty-two sequential sets of flags 68 output from the flag circuit 80. The bits stored therein may be transferred to a 32-bit vector mask register 58. The vector in the vector mask register may be used to mask results of subsequent vector operations when selected by the MASKSEL or VDSEL fields as discussed below. The status register 86, flag registers 60 and vector mask register 58 may each be accessed directly by the 80386 scalar processor.

One of the four flags 68, or those flags inverted by inverter 92, are selected by the COND field of the microinstruction through a multiplexer 72. This single flag from multiplexer 72 may be selected by a multiplexer 94 or a multiplexer 96 to control the vector processor output. The multiplexer 96 generates the VSRC signal which selects at multiplexer 62 the data to be written into the VQueue 42. The data written into the VQueue may always be taken from the floating point unit, it may always be taken from a fixed register in the register file 47, or it may be taken from the device indicated by the flag from the multiplexer 72 or indicated by the output from the vector mask 58. The selector to the multiplexer 96 is the VDSEL field of the microinstruction.

All data from the floating point unit which is passed through the multiplexer 62 is written into the VQueue with a write flag 42f. The flag is set by signal VQWE and serves as a write enable in transferring the data to the YQueue. The VQWE bit is taken from the output of the multiplexer 94 by AND gate 97 if the VQueue is indicated as the destination by the microinstruction field RDEST and the output is not for side effects only as indicated by the SEO field of the configuration register. In that case, the VQWE write flag is selected at the multiplexer 94 by MASKSEL of the microinstruction.

The selected input may be always high, always low, the flag bit output from multiplexer 72, the bit from the vector mask 58 or a bit from a snapshot register 70. The bit in register 70 is taken from a previous output of the multiplexer 72. MASKSEL may also indicate that a bit from multiplexer 72 is to be stored in the snapshot register 70. In that case, the zero input to multiplexer 94 is selected as the register 70 is loaded.

Writing to the register files 47 is enabled by RFWE from AND gate 100. When the register file is selected by RDEST through an inverter 98 when side effects only is not selected by SEO, the output from multiplexer 94 determines the RFWE register file write enable; that is, the write enable may be conditioned on the flag output from multiplexer 72, the flag output from the snapshot register 70, or the bit from the vector mask, or it may be set to always write or never write. With a write enable to the register file 47, the index to the register file is taken from RDEST.

The vector mask allows for operations which would otherwise be difficult in a two-address system. For example, consider the case of storing x+y where x is greater than y, and x−y where x is less than or equal to y. In that case, in a first vector operation, the vector mask could be created by comparing x and y. In a subsequent operation, the sum x+y would be computed and stored only for those locations indicated by the vector mask. In a final sequence, the subtraction would be performed and loaded into the remaining locations by the inverse of the vector mask. The snapshot register allows for conditional writes based on more recent input or output conditions.

The R register storage unit 47 may also be accessed directly by the 80836 microprocessor. This allows for the storage of constants to be utilized in vector operations and the recovery of sums and the like stored in the registers.

While this invention has been particularly shown and described with references to a preferred embodiment thereof, it will be understood by those skilled in the art that various changes in form and details may be made therein without departing from the spirit and scope of the invention as defined by the appended claims. For example, the SCRAM and queues could be replaced by a fully static RAM or a different micro-programming technique may be used. Also, microprocessors other than the 80386 may be utilized in practicing the invention. Further, although the 80386 addresses sequential locations in a block move operation, other constant stride moves or even non-constant stride moves efficiently handled by a scalar processor may be relied upon in implementing the present invention.

We claim:

1. A data processing system comprising:
a scalar microprocessor, coupled to the memory, which performs scalar operations, the scalar microprocessor comprising means for generating physical memory addresses, for addressing data in the memory, from virtual memory addresses, and
a vector processor, coupled to the memory, responsive to vector instructions to receive a sequence of data from the memory which is addressed by a sequence of physical addresses form the scalar microprocessor for performing a vector operation on the received sequence of data and for storing a sequence of results of the vector operation in the memory at locations addressed by physical addresses from the scalar microprocessor; wherein:

the scalar microprocessor responds to a block move instruction by reading data from locations in memory at a first set of addresses generated by the microprocessor and writing said data into locations in memory at a second set of addresses generated by the microprocessor, and in a vector operation, the vector processor receives a first sequence of data from locations in memory at the first set of addresses generated by the scalar microprocessor, inhibits writing of data into locations in memory at the second set of addresses generated by the scalar microprocessor, reads a second sequence of data which is different from the first sequence of data from locations at the second set of addresses, performs the vector operation on the first and second sequence of data and writes results of the vector operation in locations in memory at the second set of addresses.

2. A data processing system as claimed in claim 1 wherein the addresses of each of the first and second sets of addresses are of constant stride increments.

3. A data processing system as claimed in claim 1 wherein an operation of the vector processor is to generate a mask vector based on a condition of the received data, the data processing system further comprising means for disabling storage of results of a subsequent vector operation as a function of the mask vector.

4. A data processing system as claimed in claim 1 further comprising a cache memory for data processed by the scalar microprocessor in scalar operations but not for data processed by the vector processor, the data processing system comprising means for invalidating data in the cache memory which is to be replaced by results of an operation performed by the vector processor.

5. A data processing system as claimed in claim 1 further comprising a fetch queue which stores data to be processed by the vector processor, and means to invalidate data in the fetch queue in the event of a write operation by the scalar microprocessor to the location in memory from which the data was read.

6. A data processing system as claimed in claim 1 further comprising means for blocking a read or write operation relative to the location in memory into which results of the vector operation are to be written.

7. A data processing system as claimed in claim 1 wherein the memory is a static column memory, the system further comprising queues for data read from and written to memory.

8. A data processing system as claimed in claim 1 further comprising a storage unit for receiving results of the vector operations and for providing additional inputs to the vector operations.

9. A data processing system as claimed in claim 8 wherein the scalar microprocessor is able to read and write data from and to the storage unit.

10. A data processing system as claimed in claim 1 wherein the physical addresses from the scalar microprocessor identify distinct vector and scalar address spaces which address a common physical memory space.

11. A data processing system as claimed in claim 1 wherein the vector processor processes successive records of multiple words with a common code sequence, the sequence being fired with the arrival of each full record at the input to the vector processor.

12. A data processing system as claimed in claim 1 wherein the scalar microprocessor is a single chip microprocessor.

13. In a data processing system a program responsive method of performing vector operations comprising:

in a scalar microprocessor, generating physical memory addresses from virtual memory addresses for a vector operation by executing a block move instruction in which the scalar microprocessor attempts to read data from locations at a first set of addresses in memory and write the data from the first set of addresses into locations at a second set of addresses in memory;

performing a vector operation in a vector processor on data from a memory which is addressed by physical addresses form the scalar microprocessor by receiving a first sequence of data from locations in memory at the first set of addresses generated by the scalar microprocessor, inhibiting writing of the data into locations in memory at the second set of addresses generated by the scalar microprocessor, reading a second sequence of data which is different from the first sequence of data from locations in memory at the second set of addresses, and performing the vector operation on the first and second sets of data; and storing results of the vector operation in the memory at the second set of addresses from the scalar microprocessor.

14. A method as claimed in claim 13 further comprising generating a mask vector based on a condition of received data and disabling storage of the results of the subsequent vector operation as a function of the mask vector.

15. A method as claimed in claim 13 further comprising invalidating data in a scalar cache memory which data is to be replaced by results of an operation performed by the vector processor.

16. A method as claimed in claim 13 further comprising prefetching data to be processed by the vector processor and invalidating prefetched data in the event of a write operation by the scalar microprocessor to the address in memory from which the data was read.

17. A method as claimed in claim 13 further comprising blocking a read or write operation relative to the location in memory to which the results of a vector operation are to be written.

* * * * *